United States Patent [15] 3,699,625
Spencer et al. [45] Oct. 24, 1972

[54] METHOD OF MAKING MECHANICAL JOINED HOSE COUPLING OF EXTRUDED COMPONENTS

[72] Inventors: Blaine G. Spencer, Peoria; Lyle B. Clinebell, Wyoming, both of Ill.

[73] Assignee: Caterpillar Tractor Co., Peoria, Ill.

[22] Filed: Feb. 3, 1971

[21] Appl. No.: 112,483

Related U.S. Application Data

[62] Division of Ser. No. 845,425, July 28, 1969, Pat. No. 3,589,752.

[52] U.S. Cl. .........................29/157, 29/508, 29/523
[51] Int. Cl. ....B21d 53/00, B21k 29/00, B23p 15/26
[58] Field of Search ........29/523, 157, 508; 285/256, 285/258, 382.4

[56] References Cited

UNITED STATES PATENTS

| 1,945,777 | 2/1934 | Heidloff | 29/508 |
| 2,433,425 | 12/1947 | Burckle | 285/258 X |
| 2,517,706 | 8/1950 | Paquin | 29/157 |
| 3,325,194 | 6/1967 | Grawey | 285/257 |
| 3,345,091 | 10/1967 | Nicol | 285/256 |
| 3,433,505 | 3/1969 | Weatherhead | 285/256 X |
| 3,479,713 | 11/1969 | Weatherhead et al. | 29/508 X |

Primary Examiner—Charlie T. Moon
Attorney—Fryer, Ijensvold, Feix, Phillips & Lempio

[57] ABSTRACT

In a hose coupling having an extruded stem and an extruded collet which are joined so hydraulic hose can be clamped against the stem by the collet's gripping fingers when the hose is inserted therebetween, a mechanical connection between the stem and collet is effected by expanding a midportion of the stem into the peripheral dentured and grooved wall of an aperture in a radial flange forming part of the collet. The method of expanding the mid-portion of the stem and the configuration of dentured and grooved wall of the aperture insures a suitable mechanical joint between the stem and collet for a coupling operating at 4,500 psi or above.

5 Claims, 4 Drawing Figures

PATENTED OCT 24 1972
3,699,625
SHEET 1 OF 3
Fig_1_
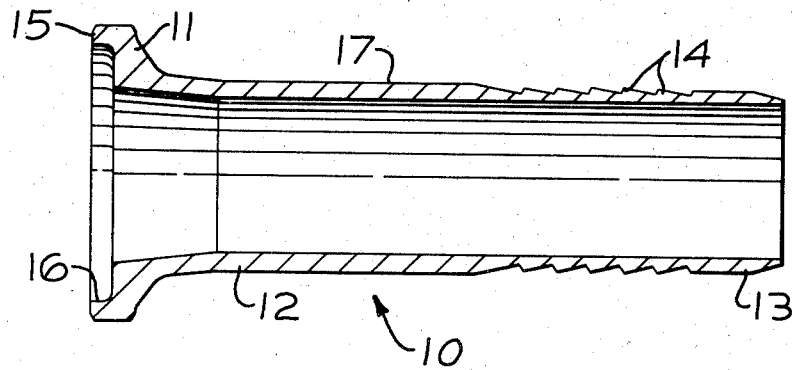
Fig_2_
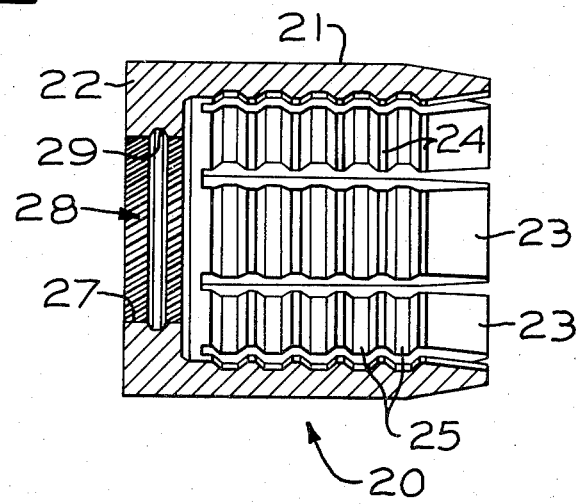
INVENTORS
BLAINE G. SPENCER
LYLE R. CLINEBELL
Tryer Jensvold Feix Phillips & Lempio
ATTORNEYS

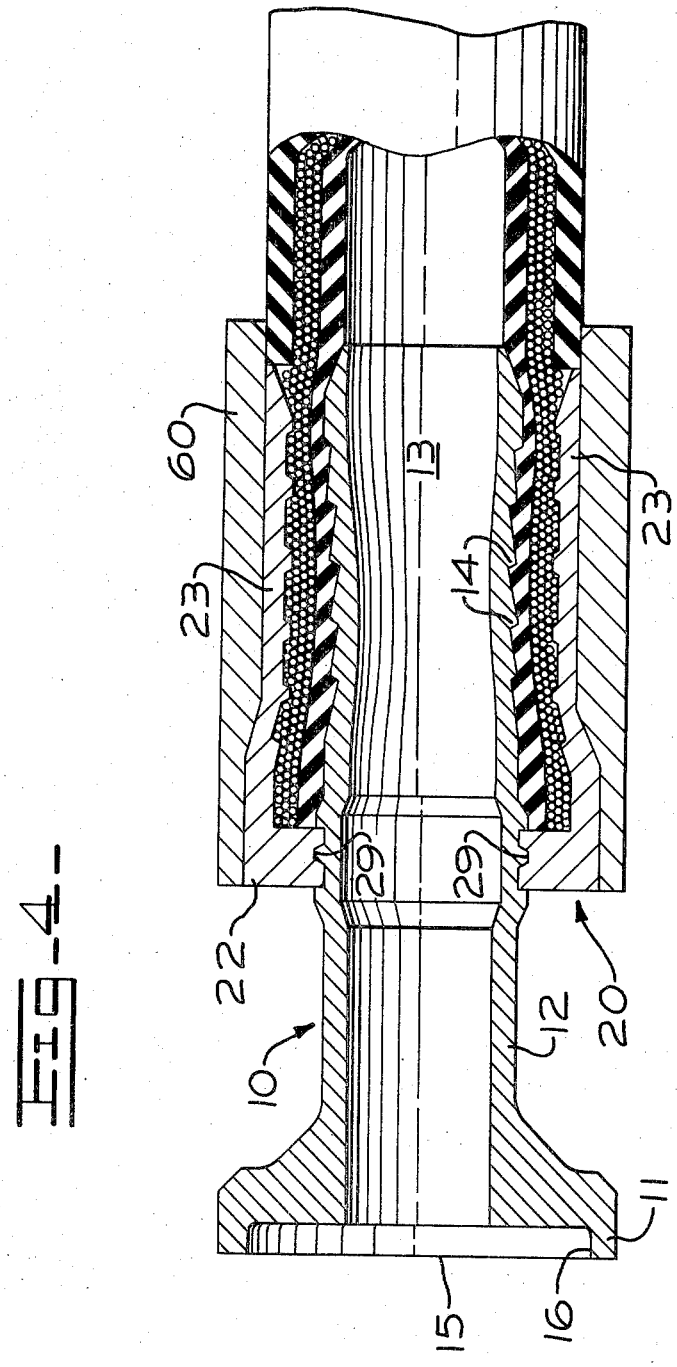

3,699,625

METHOD OF MAKING MECHANICAL JOINED HOSE COUPLING OF EXTRUDED COMPONENTS

CROSS-REFERENCE TO RELATED APPLICATION

This application is a division of application Ser. No. 845,425, filed July 28, 1969, now U. S. Pat. No. 3,589,752.

BACKGROUND OF THE INVENTION

A high-pressure hose coupling of the type herein referred to is shown in U. S. Pat. No. 3,325,194 issued to Grawey. Such a hose coupling includes a stem having a head, a collet with a plurality gripping fingers telescoped over the stem and joined thereto, and a sleeve which slides onto the collet driving the gripping fingers toward the stem so hydraulic hose inserted between the stem and collet fingers will be securely attached to the hose coupling for high pressure operation.

The stem and collet are generally formed of malleable steel and the sleeve, which telescopes over the fingers, can be removed, and the fingers pried up from the hose carcass so the the coupling can be reused. While this feature along with its very compact character has resulted in quick commercial acceptance of this new type of hose coupling, the costs of these hose couplings have remained high due to the large amount of machining which is required to fabricate the coupling illustrated in U. S. Pat. No. 3,325,194.

Previously, the components were cast separately, machined to their final dimensions and then assembled by brazing the head to the stem and the stem to the collet. A close fit between aperture in the radial flange in the collet and the stem is required where these two components are joined together so a satisfactory brazing joint can be achieved. A strong joint is required since this joint between collet member and the stem will experience high torque and axial loadings when the coupling is joined to the hose and placed in service, as well as severe vibration shocks and extreme variations in temperature.

To improve the coupling and lower its cost, the stem and collet have been cold extruded from materials of different hardness characteristics. Alternately, the stem and its head portion can be extruded from the same material as is the collet and separately heat treated so they are harder than the collet which should be softer to insure good malleability so the coupling can be reused many times without breaking off the gripping fingers. The harder stem improves the reliability of the coupling.

These extruded parts which require a lesser degree of machining than the cast parts, must be joined suitably to fabricate the coupling. Attempts to braze the collet to the stem of the extruded components met with little success since the presence of lubricant on the component parts from the extruding operation often caused defective joints. Also, the furnace brazing destroyed the differential hardness characteristics of the stem and collet which are desired qualities to ensure satisfactory performance of the coupling composed of extruded components.

Therefore, it is a principal object of the current invention to develop a satisfactory technique for joining extruded coupling components without losing the economies obtained through the extrusion techniques.

Also, it is an object to join an extruded stem with an extruded collet both of a different hardness without loss of their individual hardness characteristics while still providing a satisfactory joint therebetween.

Another object is the provision of a new type of mechanical joint between a stem and collet that is capable of withstanding the multiple stresses imposed thereon during use of the coupling.

SUMMARY OF THE INVENTION

A hose coupling having an extruded tubular stem with a head and an extruded collet having a radial flange at one end and a plurality of gripping fingers disposed parallel to the axis of the stem on which the collet telescopes, said flange having an aperture for receiving a mid-connecting portion of the stem, and a joint between the stem and aperture wall including denticulated surface in the aperture wall, a central groove therein separating the denticulated surfaces, and portions of mid-wall of said stem in the area contiguous to said aperture wall expanded radially outward to fill said groove, mate to said denticulated surface and slightly overlap the outer two sides of said radial faces of the radial flange whereby a mechanical joint is effected therebetween which is capable of withstanding the stresses the joint will experience during employment of the hose coupling.

The method accomplishing the fabricating of the novel coupling includes extruding a stem, extruding a collet, forming a sized aperture in the radial flange of the collet, denticulating said aperture wall and forming a mid-circumferential groove in the aperture wall, telescopingly assembling said stem with said collet, radially expanding the mid-wall of said stem sufficiently to fill said groove mate with said denticulated wall and slightly lap the outer radial faces of the radial flange of the collet about its aperture.

BRIEF DESCRIPTION OF THE DRAWINGS

The invention is disclosed in the specification and accompanying drawings wherein:

FIG. 1 is a section of an extruded stem which forms a component of the hose coupling;

FIG. 2 illustrates, in section, an extruded collet which is assembled with the stem shown in FIG. 1 to form the hose coupling;

FIG. 4 shows the complete coupling assembled with an end of wire reinforced hydraulic hose, in section.

DESCRIPTION OF AN EMBODIMENT

Figure 3:
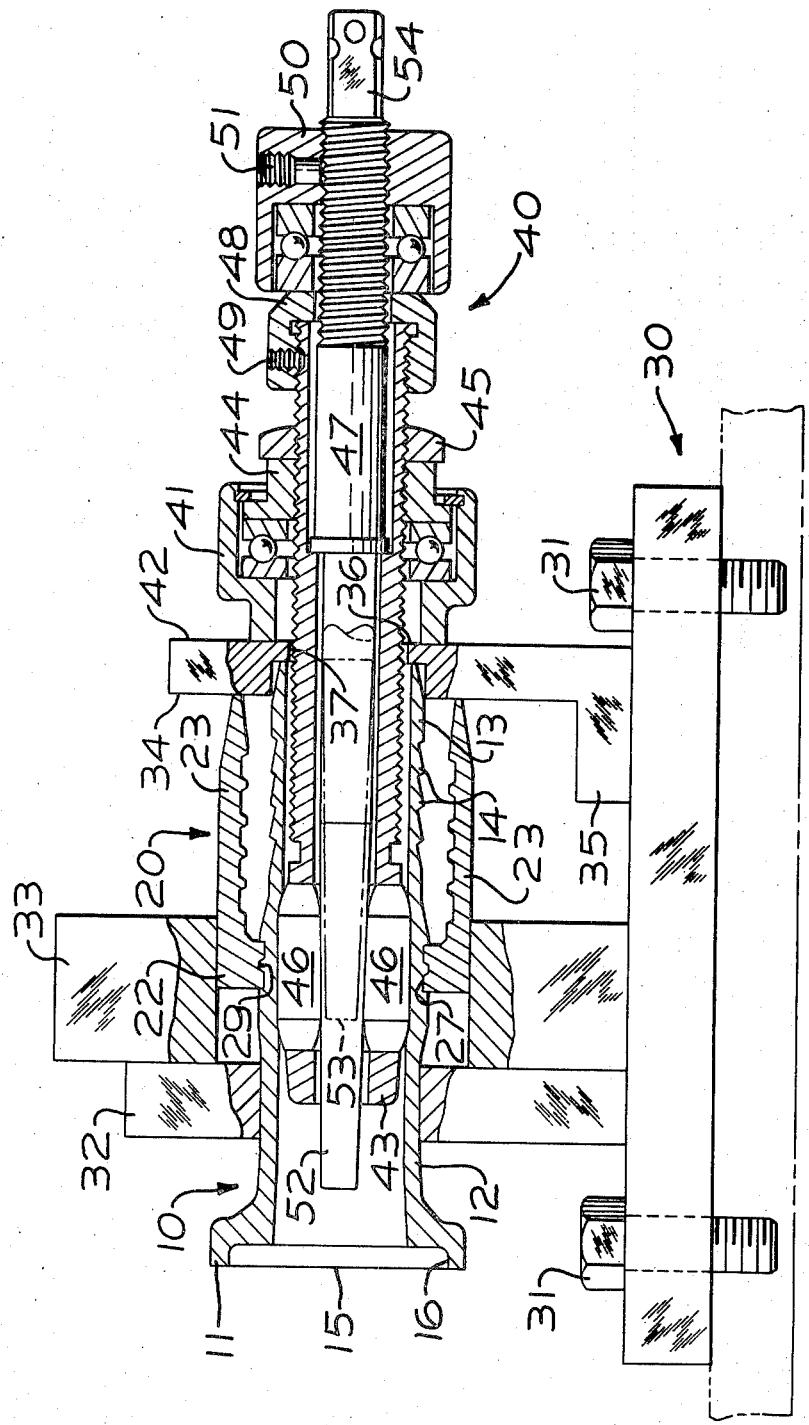
FIG. 3 is a section of an assembling apparatus illustrating how the stem and collet are mechanically "locked" together.

In the past it has been common practice to join thinwall tubing to a fitting or the like by expanding the end of the tubing radially to fit into an encircling fitting structure. For example, see U S. Pat. No. 3,188,733 issued to Rickard and U. S. Pat. No. 2,898,971 issued to Hempel. In these situations, the joint could be of adequate axial length to stabilize the joint against relative axial deflection along the concentric longitudinal axes of the joined parts, as well as a large area torque-transmitting interface.

The situation in connecting the coupling stem and collet presented several problems in that the joint between the stem and collet was narrow and sizable torque and axial loading were taken by the joint, especially when the sleeve is assembled on the collet to cause its fingers to grip the hydraulic hose against the stem portion with sizable pressures. In addition the cantilevered design of the fingers of the collet member often will cause the joint to be subjected to severe stress, since the tipping moments are mechanically multipled. Further, the joint had to be accomplished in the central wall section of the stem which was remote from either its open ends. In addition, the head of the stem is often angled to accommodate connection of the head to various structures thus preventing access through the head end and limiting the insertion of tooling from the hose holding end.

In view of these above problems the instant coupling and method of manufacture were developed.

The stem 10 is cold extruded in the general configuration illustrated in FIG. 1. It includes a head 11, a central body portion 12, and a nipple portion 13 which can be inserted in the end of hydraulic hose to which the coupling is to be attached. The nipple portion includes a series of circular ridges 14 which are cut on its outer surface to enhance its ability to retain the hydraulic hose received thereon. Normally, the connecting face 15 and O-ring groove 16 of the head are accurately machined subsequent to extrusion of the stem. In the mid-portion of the stem, the outer surface 17 of the body portion is not machined where the aperture of the collet is received when the extruded components are telescoped together since this is not necessary.

The cold-extruded collet 20 is shown in FIG. 2 and has generally a cylindrical hollow body 21 with an inwardly projecting radial flange 22 located at one end. A plurality of longitudinal grooves or slots, extending from adjacent to the flange to the opposite end, divide the circular body into a plurality of gripping fingers 23 whose inner surfaces include radial lands 24 and grooves 25 that enhance its gripping action when the fingers are driven toward the nipple portion of the stem by the swaging sleeve. These are machined after the collet has been extruded and before punching out the grooves.

The open end of the body 21 of the collet is machined to provide the tapers at the end of the collet fingers as is the wall 27 of the aperture 28 in the flange 22 so the aperture will be received on the surface 17 of the stem 10 in a fitted relationship when the two components are telescoped together. The wall 27 of the aperture is machined smooth, then denticulated through employment of a conventional knurling tool and a circumferential groove 29 is cut in the mid-portion of the wall, as illustrated in FIG. 2.

Denticulation of the wall 27 is accomplished by using a toothed tool which produces approximately 40 indentations per inch which are skewed approximately 30° from the longitudinal axis of the collet. A skew of 20° to 40° is acceptable. As an alternate the skew on one side of the groove may be formed opposite to that on the other side, to improve the integrity of the joint. The circumferential groove preferably is about 0.030 inches deep with its sides disposed at an angle of approximately 30° to the longitudinal axis of the collet to permit maximum filling of the groove by the expanding operation and hence optimum axial holding power in the joint.

Of course, the teeth on the resulting denticulated wall will have the same angles as the teeth on the tool. The skew on both sides of the groove allows the denticulated walls to aid in absorbing axial loadings as well as torque loadings. Obviously, alignment of the teeth with the longitudinal axis of the collet would not allow them to aid in absorbing axial loadings which is important in view of the narrow joint and limited contact areas between the collet and stem.

FIG. 3 illustrates both the apparatus by which the mechanical "lock" between the stem 10 and collet 20 is effected and also the resulting mechanical joint between these extruded components. A fixture 30 is illustrated as mounted on a support with bolts 31 and includes two split clamping dies. Stem clamping die 32 accepts the body portion 12 of the stem 10 while collet clamping die 33 accepts the end of the collet 20 having the flange 22. Generally, the collet will be placed in the fixture so the ends of its fingers 23 abut on the face 34 of a spacing stop 35 and is thereafter clamped in place by its die. Subsequently, the nipple portion 13 of the stem is inserted through aperture 28 until its end abuts against ridge 36 in the opening 37 in the spacing stop, which centers the nipple portion in the collet, as illustrated. When stem is clamped in place by its die, the proper positioning of the stem and collet will be achieved with the aperture in the flange positioned on surface 17 of the stem.

After these components have been positioned, a tool 40 is inserted into the end of the nipple portion of the stem through the opening 37 in the spacing stop 35 until its thrust-bearing collar 41 abuts on outer face 42 of the spacing stop. A threaded hollow mandrel 43 is supported for rotation by the thrust collar and locked to a bearing supported sleeve 44 with nut 45 so a plurality of elongated rollers 46 on the inserted end of the mandrel are centrally positioned within the body portion 12 of the stem surrounded by the denticulated and grooved wall of aperture 28. Normally, these rollers have a length twice the width of flange 22 and are employed and should have approximately a 1½° negative angle for best results. Axial bearing slots in the inserted end of the mandrel support the elongated rollers but allow them to move radially as a rotating tapered shaft 47 is axially advanced under the rollers until its inward axial advance is stopped by an adjustable collar stop 48 threaded on the outboard end of the mandrel and locked therewith by set screw 49. A shaft collar 50 locked to the threaded end of the shaft 47 with set screw 51 includes a bearing which abuts on the collar stop limiting inward axial advance. The relative adjusted relationship of the collar stop and shaft collar will determine the maximum inward axial advance of the tapered end of the shaft and hence the maximum outward expansion of the stem wall.

The tapered end 52 of the shaft which should have less than a 7° taper is, of course, partially withdrawn from under the rollers 46 when the hollow mandrel 43 is inserted into the nipple portion of the stem. This position is indicated by phantom lines 53 in FIG. 3. Thereafter, the square protruding end 54 of the shaft is connected to an air motor and rotated as the shaft is advanced into the hollow mandrel until the stops are contacted, after which the shaft is allowed to rotate to cold-work the area of the stem expanded by the rollers. This increases the stem hardness in the joint from approximately 60—60 $R_B$ to 90–95$R_B$ due cold working.

In FIG. 3 the stem has been fully expanded and its O.D. expanded to fill groove 29 in the wall 27 of the aperture 28 and to mate with the skewed denticulations on its wall 27. Further, the O.D. is expanded on both sides of the radial flange 22 of the collet so these expanded areas of the stem actually overlap the radial faces of the flange about the periphery of the aperture.

As a result, the collet is mechanically locked to the stem in the central portion thereof with a joint, which though narrow, has adequate strength to resist axial, torsional and tipping loads. The skew of the teeth of the denticulated wall of the aperture enables the full joint width to resist the high axial loading which may occur when the sleeve 60 is assembled on the collet with the nipple portion of the stem inserted in hydraulic hose to be connected by the swaging action of the sleeve as it drives the fingers toward the stem to grip the skived end of the hose, as shown in FIG. 4.

Couplings made by the subject process have been subjected to over 1 million cycles of pressure from 0 to 5,000 psi without failure. These couplings were then taken apart and the hose replaced to test the reusable feature of the couplings which passed another two million cycles on test without failure. This indicates the subject joining process to be of a quality very superior to brazing procedures for extruded component couplings and gives the potential of faster assembly at less cost.

I claim:

1. A method of manufacture of a hose coupling assembly having a hollow tubular stem with a head at one end and a nipple at the other end and a cylindrical collet having a radial flange at one end and a plurality of longitudinal slots extending from adjacent to said flange to the opposite end of the collet dividing it into a plurality of gripping fingers which collet is joined to the stem through the radial flange of the collet comprising:
    cold extruding a tubular stem with a head end and a nipple end;
    cold extruding a hollow cylindrical collet having an inwardly projecting radial flange at one end;
    punching longitudinal slots in the cylindrical wall of said collet to form a plurality of gripping fingers depending from the flange end of said collet;
    milling a sized aperture in said flange concentric with the longitudinal axis of said collet;
    telescopingly assembling said collet on said stem so the sized aperture is contiguous to the central section of said stem and said gripping fingers surround said nipple end; and
    expanding outwardly the central wall portion of said stem which passes through said aperture and extends a short distance on either side thereof sufficiently so said wall portion of said stem conforms to the wall configuration of said aperture and overlaps said flange on both sides thereof about the periphery of said aperture.

2. The method according to claim 1 wherein grooves are machined in the nipple end of the stem to form a plurality of ridges on its outer surface for better hose retention and grooves are machined on the inner wall of the collet to form ridges for the same purpose prior to punching out the longitudinal slots to form the plurality of gripping fingers.

3. The method according to claim 2 wherein the circular wall of the sized aperture is denticulated prior to assembling the collet on the stem, with the denticulation skewed from 20° to 40° with reference to the longitudinal axis of said collet.

4. The method according to claim 3 wherein the circular wall of the sized aperture is circumferentially grooved in its central portion after denticulation.

5. The method according to claim 4 wherein the orientation of the denticulation on opposite sides of the circumferential groove are oppositely disposed.

* * * * *